April 11, 1967 M. L. HOCH ETAL 3,313,330
CUTTER HEAD WITH SELF-CLEANING CLUTCH AND BRAKE
Filed Feb. 3, 1965 2 Sheets-Sheet 2
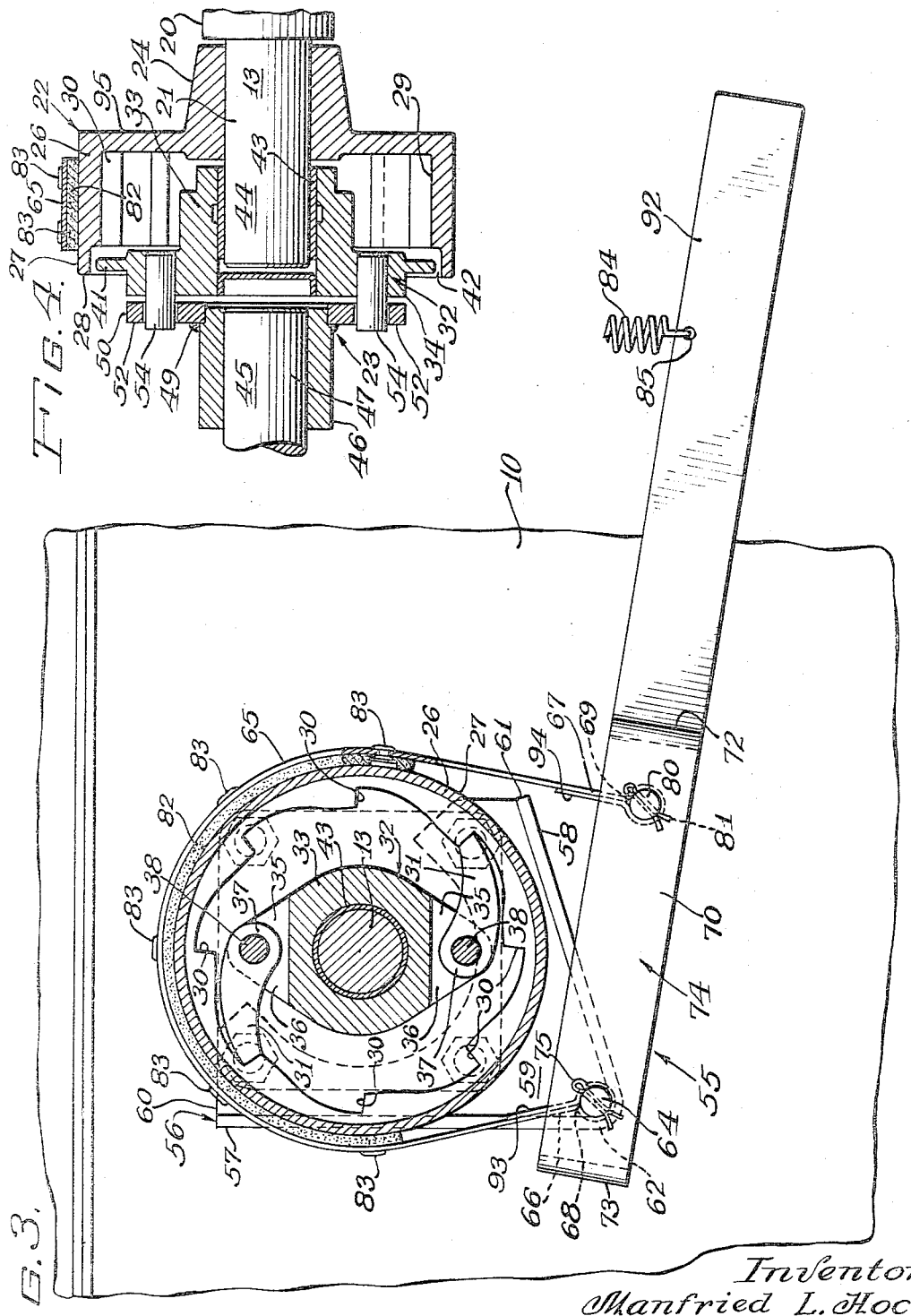
Inventors:
Manfried L. Hoch
James Corwith, Jr.
By John J. Kowacic
Atty.

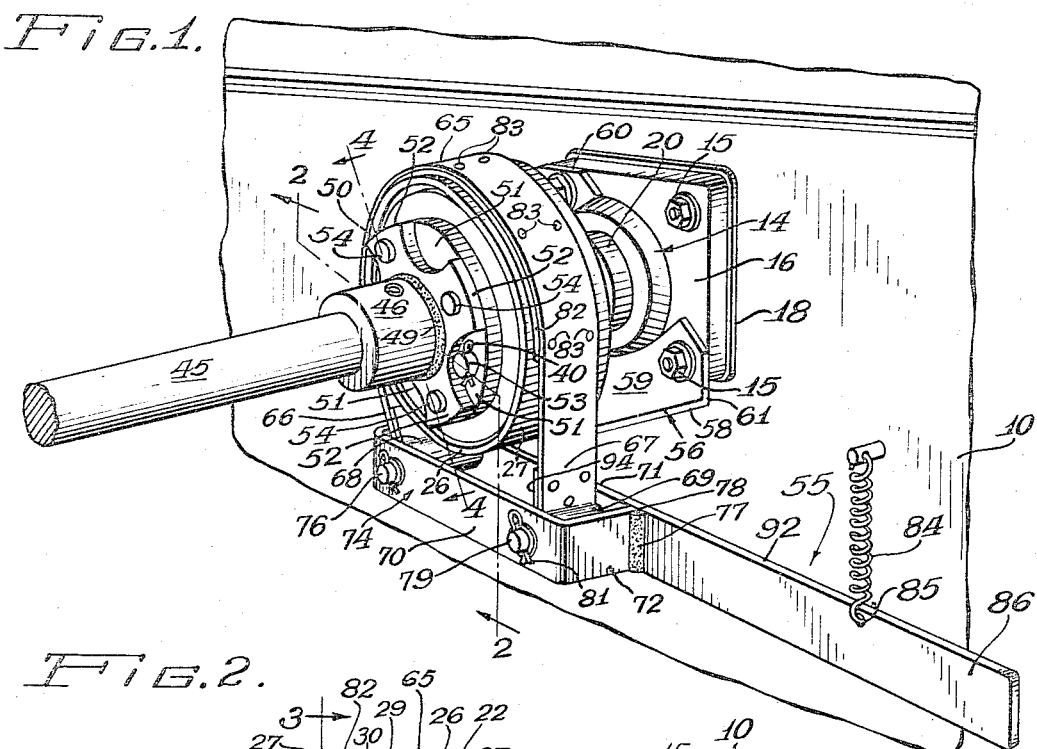

United States Patent Office 3,313,330
Patented Apr. 11, 1967

3,313,330
CUTTER HEAD WITH SELF-CLEANING
CLUTCH AND BRAKE
Manfried L. Hoch, Lockport, Ill., and James Corwith,
Jr., Bettendorf, Iowa, assignors to International Harvester Company, a corporation of Delaware
Filed Feb. 3, 1965, Ser. No. 429,989
3 Claims. (Cl. 146—117)

This invention relates to forage harvesters. Particularly it relates to a brake system assembly adapted for use in braking harvester cutter heads and the like.

A conventional forage harvester comprises a harvesting unit which aggressively procures crop and delivers it to a feeder assembly by which such crop is conveyed into a cutter head casing formed in the harvester. A cutter head is rotatably mounted within a cutter head casing and carries a plurality of circumferentially spaced knives which extend transversely of the harvester body and its path of movement. The knives serve to cut, chop or otherwise divide crop delivered to the cutter head casing.

In a conventional forage harvester, the cutter head is rotatably actuated through a power train which is operably connected to the prime mover which serves as a source of power for operable harvester devices. The power train includes a clutch mechanism by which the cutter head becomes selectively operative.

In a conventional forage harvester device, its clutch mechanism is not provided with a housing, partially in the interest of economy. Furthermore, conventionally, means are not provided to stop rotation of the cutter head once its clutch mechanism has been disengaged, and, accordingly, although cutting power may be neither required nor desired, the cutter head will continue to rotate until it stops itself.

By reason of exposure of such clutch mechanism, clogging and jamming thereof are frequent occurences, as conditions under which harvesters are used tend to direct debris and other material toward a clutch mechanism which comprises a number of spaced apart components between which the debris and other material accumulate to interfere with efficient operation.

While it is desirable to minimize or eliminate the accumulation of debris and material about and between working parts of a clutch mechanism of the class described, the objection to increased cost by reason of encasing a clutch mechanism has overridden solution of the problem in that fashion.

By providing inexpensive-to-produce heat, sufficient to burn the debris, the clutch-clogging problem can be efficiently solved. This can be done by applying heat to a conventional clutch drum which is an outer member of a conventional clutch mechanism. The heat may be produced by means of a brake member comprising a band disposed in grippable engagement with a clutch drum. Of course, the brake in addition to providing the required heat also will serve to stop a cutter head to thereby overcome another of the aforestated shortcomings.

It is an object of this invention to provide an improved brake assembly.

It is an additional object of the instant invention to provide a brake for a harvester cutter head.

It is additionally an object of the instant invention to utilize heat developed incidentally to the operation of a brake to burn accumulations of debris about a clutch the operated mechanism of which said brake is adapted to stop.

It is af urther object of the instant invention to provide an inexpensive assembly adapted for installation on conventional equipment which will serve as a brake for a conventional cutter head clutch.

A yet further object of the instant invention is the provision of a manually operable brake mechanism including a brake band disposed about a clutch and having manually operable lever means for causing the brake to stop the rotation of an output shaft to a harvester cutter head.

A still further object of the instant invention is the provision of a brake assembly for an overrunning clutch having a clutch drum rigidly secured to an output shaft and in which a brake band is disposed about the outer surface of the clutch drum and releasably engageable therewith, and the inner surface of said drum is adapted to be engaged by disengageable dogs, whereby the inner surface of the clutch drum acts for clutching purposes and the outer surface of the clutch drum serves for braking purposes.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a perspective view of one embodiment of the instant invention.

FIG. 2 is a sectional view taken longitudinally of the input and output shafts substantially on the line 2—2 of FIG. 1 and looking in the direction of the arows.

FIG. 3 is a sectional view transversely of said input and output shafts taken substantially on the line 3—3 of FIG. 2 and looking in the direction of the arrows.

FIG. 4 is a sectional view taken substantially on the line 4—4 of FIG. 1 and looking in the direction of the arrows.

Referring now more particularly to the drawings, there is seen a part of a side housing member or wall 10 of a forage harvester cutter head (not shown). The side wall 10 has therein an aperture 11 through which the operative end portion 12 of an output shaft generally designated 13 is projected for operative connection to a cutter head (not shown) disposed within the cutter head housing. A medial portion 19 of the shaft 13 which is disposed outside of the housing and immediately adjacent thereto is journalled in a bearing 20 disposed in alignment with the aperture 11. Bearing 20 is carried in a bearing housing 14 the mounting flange 16 of which is spaced slightly outwardly of the housing side member 10 by a washer 18 disposed about aperture 11 and on its opposite side faces bearing against the bearing flange 16 and the housing member 10, as illustrated in FIG. 2. A plurality of fasteners, such as bolts 17 which are extended through the flange 16 and nuts 15 mounted on such bolts, serve to secure the bearing housing 14 to the outer surface of the housing side wall 10 by drawing flange 16 tightly against washer 18.

The outer end portion 21 of the output shaft 13 extends outwardly from housing member 10 and has secured thereto the drum 22 of an overrunning clutching generally designated as 23. The hub 24 of drum 22 is keyed to shaft portion 21, as illustrated at 25, to lock the drum 22 from rotation independently of the shaft 13.

Integral with and defining the drum 22 is a plate 95 which extends radially from the hub 24. A drum-defining annular flange 26 having a substantially smooth and even outer surface 27 extends normally from the radial plate 95 spaced outwardly and concentrically from shaft 13, as illustrated in FIG. 2. The flange 26 divides into two parts, one of which is distal from plate 95 and comprises a narrow annulus or band 28 the inner radius of which is greater than that of the other, or inwardly contoured portion 29 the inner surface of which is formed to provide a plurality of teeth or catches 30. The teeth or catches 30 are disposed circumferentially of the inner surface 29 of the drum 22, in the manner illustrated in FIGS. 2 and 3, and only some thereof have been numbered to minimize crowding in the drawing.

The teeth 30 are adapted to be engaged by the pivoted dogs or pawls 31 pivotably mounted on a dog- or pawl-carrying member 32 of the clutch 23. As illustrated in FIGS. 2, 3 and 4, the pawl-carrying member 32 has a hub portion 33 which is journalled on and extends longitudinally of the outermost portion 44 of output shaft 13, being projected from its outer end radial flange 34 into the drum 22 to dispose said pawls in operable alignment with said teeth or catches 30.

The hub has a plurality of radially extending ears 35 which are spaced inwardly from the radial flange 34 to provide a plurality of recesses 36 between said ears 35 and said flange 34, as illustrated in FIGS. 2 and 3. The inner end portions 37 of pawls 31 are pivotally secured in said recesses 36 by means of respective pivot pins 38 which extend through the radial ears 35 and the flange 34, as illustrated in FIG. 2. The pins 38 are retained from displacement to the left with respect to FIG. 2, by means of pivot pin heads 39 which engage the inner surfaces of the ears 35, and to the right with respect to FIG. 2, by cotter pins 40 projected through the outer end portions 53 of said pins, as illustrated in FIGS. 1 and 2.

Accordingly, in the fashion of a conventional overrunning clutch, the pawls 31 will be gradually pivoted eccentrically about pins 38 as the speed of the motor increases, until they operably engage teeth 30 and thereby connect drum 22 and pawl-carrying member 32. As the speed of the motor decreases, the pawls 31 will tend to rock to their quiet position in which the drum 22 and pawl-carrying member 32 are disconnected.

The radial flange 34 of the pawl-carrying member 32 has integral therewith and extending outwardly therefrom a peripheral lip 41 which is disposed within the annulus or band 28. To accommodate the rotation of the parts, it is requisite that the outer edge of lip 41 be spaced from the annulus 28. Such spacing accordingly provides an entryway 42 for trash, debris and other undesirable material to the interior of the clutch drum 22, the accumulation of which tends to interfere with the normal operation of the clutch the disposition of which is such that it is exposed under field conditions without protective covering, as illustrated in the drawings.

The pawl-carrying member 32 is driven about the shaft 13 when the pawls 31 are not extended or in operable engagement with the teeth 30. A bearing sleeve or bushing 43 is mounted on the outermost end portion 44 of shaft 13 to accommodate the rotation of said pawl-carrying member 32. The pawl-carrying member 32 is driven by an input shaft 45 which is operably connected to a prime mover means (not shown). Such prime mover means may be a harvester power plant.

The means by which the input shaft 45 is connected to the pawl-carrying member 32 comprises a hub or sleeve section 46 to which the inner end portion 47 of shaft 45 is keyed, as illustrated at 48 in FIG. 2. The inner end portion of the hub 46 has rigidly secured thereto by means of welding or the like, as illustrated at 49, a radially extending flange 50 having a plurality of outwardly opening peripheral notches 51 separated by spokes 52, as clearly illustrated in FIG. 1. As illustrated in FIGS. 1 and 2, the outer end portions 53 of the pins 38 are disposed in a pair of opposed of the recesses 51. As illustrated in FIGS. 1 and 4, a plurality of dowel pins 54 which extend axially of the shafts 45 and 13 are mounted in aligned apertures in the spokes 50 and the pawl-carrying clutch member 32 to connect the clutch member 32 with the input shaft.

By referring to the drawings, it is seen that the input shaft 45 and output shaft 13 are in operable or co-axial alignment. For mechanical purposes, the dowel pins 54 are disposed on a common radius from the center of the shaft 45, being spaced from adjacent thereof an equal distance, as illustrated clearly in FIG. 1.

The overrunning clutch which has now been described operates in a conventional manner. That is to say, as the input shaft 45 rotates, its torque is transmitted through the dowel pins 54 and the pivot pins 38 to the pawl-carrying clutch member 32, and causes the same to rotate independently of the input shaft 13. When the speed of rotation becomes great enough, however, centrifugal force forces the pawls 31 into the position illustrated in FIG. 3 to engage the teeth 30, whereby the pawl-carrying clutch member 32 and the drum 22 become locked together. Thereupon the torque is carried to the drum 22 which is fast on the shaft 13, and thereby the shaft 13 is caused to rotate together with the drum 22, the pawl-carrying clutch member 32 and the input shaft 45, to thereby drive the cutter head 12a in the cutter head housing. When the speed of rotation of the shaft 45 is slowed, the pawls 31 will be released from engagement with the teeth 30 in a conventional manner to uncouple the input shaft 45 and output shaft 13. However, the inertia of the parts connected to shaft 13 will continue to drive said shaft and each mechanism driven thereby, even though operation is no longer desired. In conventional harvesters of the described class, no brake is provided. Because waiting for the drum 22 to stop by itself is exceedingly time consuming, operators do not care to wait. A hazard exists, accordingly, by reason of needless rotation of the cutter head.

To the end that a forage harvester is provided with means for stopping its cutter head when the drive thereto is interrupted, there is provided in accordance with the instant invention a braking mechanism generally designated as 55 and comprising an attachment or assembly easily mountable on existing forage harvester equipment and the like. The braking mechanism includes a mounting bracket 56 which is disposed between the drum 22 and the flange 16, as clearly illustrated in FIGS. 1 and 2.

The bracket comprises a pair of angularly disposed arms 57 and 58 which extend outwardly normally from an integral flat surfaced mounting plate 59 which lies against a portion of the flange 16 to which it is secured by some of the bolts 17 and associated nuts 15, as illustrated in FIGS. 1 and 2 and in dotted lines in FIG. 3. The arm 57 may be considered as being triangular and disposed vertically. The arm 58 may be considered triangular and disposed at an angle of about 70° from the arm 57. From its upper end 60, the arm 57 slopes outwardly from the housing member 10 as it slopes downwardly, as clearly illustrated in FIG. 2. The arm 58 also slopes outwardly from the housing member 10 as it extends downwardly from its outer end 61 toward the arm 57. Thereby, a wide angular web 62 is provided which serves as a seat or support for a therein rigidly secured shaft or pivot pin 63 whose outer end portion 64 is projected outwardly from said bracket 56 away from the housing member 10, and thereby provides an axis of rotation parallel to the axis of rotation of the coaxially aligned shafts 13 and 45.

The upper portion of a U-shaped brake band 65 is disposed about the outer surface 27 of the drum 22. Said band has a pair of downwardly etending spaced end portions 66 and 67 in the lowermost extremities of which there are provided a pair of passages or loops 68 and 69 which are shown in dotted lines in FIG. 3. As illustrated, the passages 68 and 69 may be formed by bending sections 93 and 94 of said band 65 backwardly on said band and securing said sections 93 and 94 to facing portions of said band 65 in any manner well known in the art and as illustrated in FIGS. 1 and 3.

A rectangular framework generally designated as 74 comprising opposite side members 70 and 71 and integral end members 72 and 73 is mounted on the outer end portion 64 of the shaft 63, with the end portion 64 projected transversely of and through the opposite frame members 70 and 71. The frame members 70 and 71 may be substantially parallel to the housing member 10, as clearly illustrated in FIG. 2 of the drawings. A cotter pin 75 through that outermost portion 76 of the shaft 63 which extends beyond the frame member 70 secured the framework 74 from lateral displacement on the shaft 63. The shaft 63 is disposed at one end portion of said framework 74 and provide a fixed axis for rocking said framework 74 by means of an elongated lever 92 which extends outwardly from the framework 74 and which in the instant embodiment is an extension of the side frame member 71. As illustrated in FIG. 3, the frame 74 may be bent from a single section into the form of a rectangle and secured along the line of soldering 77 which connects the free end portion 78 of the end member 72 to the frame member 71 and the lever 92 at the junction thereof.

A pin 79 which is disposed parallel to the pin or shaft end portion 64 is secured in the framework 74 at an end portion thereof which is opposite the end portion in which the shaft section 64 is mounted. An end portion 80 of said pin 79 extends outwardly of the frame member 70, and has a cotter pin 81 projected therethrough to secure the pin 79 and the frame in a conventional manner.

The opposite end portions 66 and 67 of the brake band 65 are disposed in the frame 74 with the shaft section 64 projected through the tunnel 68 and the pin 79 projected through the tunnel 69, whereby the brake mechanism 55 is rockable about the axis provided by the shaft 63.

A brake lining 82 is mounted on the inner surface of a medial portion of the band 65 and secured thereto by means of rivets or the like 83.

Inasmuch as the foregoing arrangement tends to hang the brake mechanism 55 on the drum 22 and bring the brake lining 82 into contact with surface 27, a tension spring 84, the upper end of which may be suitably anchored to a portion of wall 10, is releasably connectable at its lower end portion 85 to the lever 92 to exert a counterclockwise torque about the pin 63 to disengage the brake lining 82 from the surface 27 when the brake is not in use. To use the brake, of course, the spring-holding mechanism will be disengaged from the lever 92, permitting a force directed downwardly with respect to FIG. 1 to be exerted on the outer end portion 86 of the lever 92 to rock the brake mechanism clockwise about the axis provided by the pin 63.

In use, of course, the brake mechanism 55 will be applied when the clutch disengages. That is to say, by bearing downwardly with respect to FIG. 1 on the outer end portion 86, the brake and the drum 22 will be brought into frictional engagement to thereby stop rotation of said drum 22, and, accordingly, of the output shaft 13. The friction created during braking will provide heat sufficient to burn debris accumulated between the drum 22 and the pawl-carrying member 32.

The foregoing arrangement of parts provides an overriding clutch drum the inner surface of which provides the means for connecting an input shaft to an output shaft, and the outer surface of which provides means for braking to stop rotation of the output shaft.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. In a forage harvester having a cutter head, an overrunning clutch construction for operating said head, said head rotatably mounted on a body having a wall, said clutch comprising a power output shaft operably connected to and driving the head; an overrunning clutch drum defined by an outer annular wall having a smooth outer surface and secured to said shaft; a power input shaft disposed in co-axial alignment with said output shaft; a clutch member secured to said input shaft and disposed within said clutch drum; means for selectively and intermittently connecting said clutch member with said drum; a bracket secured to said wall; a pin extending outwardly from said bracket and providing a fixed axis of rotation; a curved brake band having an upper portion mounted about and adjacent said smooth outer surface and having a pair of spaced lower end portions extending below said drum; a brake lever having one end portion pivoted on said pin and an opposite end portion adapted to have a force applied thereto, one of said brake band lower end portions pivotally connected to said pin and the other of said brake band end portions connected medial of said brake lever end portions, whereupon application of a downward force to the opposite end portion of said lever, the clutch drum is engaged by said brake band, and said bracket comprising a pair of triangle-like legs angularly disposed to each other and normal to said wall and providing a seat, said pin secured in said seat and extending normally from said wall.

2. The device defined in claim 1 in which said legs have outer edges sloping toward said wall as they extend away from said seat, and base portions defining said seat, said seat being normal to said wall.

3. In a forage harvester having a cutter head, means for driving the head including an overrunning clutch having a relatively thin generally cylindrical housing portion constrained for rotation with the head, and heat generating brake means including a brake band frictionally engageable with the housing along a substantial external peripheral extent thereof for stopping the head and coincidentally heating the housing through frictional engagement therewith said housing being of sufficient thinness to cause said brake means when engaged to heat the interior thereof to vaporize condensation and foreign material thereon and free abrasive accretions accidentally entered into the housing, said overrunning clutch including pawl means and teeth within the housing, said pawl means adapted to jar the accretion within the housing loose therefrom coincidentally with the application of said brake band heating said housing whereby causing said accretions to loosen from the housing, and said housing having an opening at one end thereof oriented to gravitationally discharge said accretions therefrom.

References Cited by the Examiner
UNITED STATES PATENTS

| | | | |
|---|---|---|---|
| 1,660,551 | 2/1928 | Garson | 192—17 |
| 2,515,295 | 7/1950 | Davis | 192—17 |
| 2,515,434 | 7/1950 | Zwald | 192—17 X |
| 3,004,646 | 10/1961 | Seiden | 192—17 |
| 3,026,665 | 3/1962 | Hoff | 192—17 X |
| 3,253,391 | 5/1966 | Meldahl | 192—17 X |

MARK NEWMAN, *Primary Examiner.*

BENJAMIN W. WYCHE III, *Examiner.*